April 18, 1967  F. V. McCANLESS ETAL  3,315,079
BACKGROUND NOISE MINIMIZER USING VIBRATING
RETICLE AND PHOTOCELLS IN OPPOSITION
Filed Feb. 26, 1964                                         2 Sheets-Sheet 1

INVENTORS.
FLOYD V. McCANLESS
& GLEN R. QUASIUS
BY
Roger W. Jensen
ATTORNEY

INVENTORS
FLOYD V. McCANLESS
& GLEN R. QUASIUS
BY
ATTORNEY

United States Patent Office 3,315,079
Patented Apr. 18, 1967

3,315,079
BACKGROUND NOISE MINIMIZER USING VIBRATING RETICLE AND PHOTOCELLS IN OPPOSITION
Floyd V. McCanless, St. Petersburg, and Glen R. Quasius, Clearwater, Fla., assignors to Honeywell Inc., a corporation of Delaware
Filed Feb. 26, 1964, Ser. No. 347,561
2 Claims. (Cl. 250—209)

This invention pertains to a radiation sensor and more particularly to a radiation sensor having background radiation rejection characteristics.

One of the major problems which exists in radiation sensors and especially light sensors utilized in startrackers is a combination of a background light gradient and edge modulation. A background light gradient is caused by a bright source of light producing a light gradient, or a variation in brightness, across the field of view or some portion thereof. Clouds, the sun and planets cause a background light gradient in startrackers for example. It can be seen that background light is a serious problem in the operation of startrackers and the like since bright spots in the sky produce such large signals in a light sensor that the actual signal produced by the desired star is completely obliterated.

In prior art devices to reduce the effect of background light a reticle is utilized to modulate the light before it reaches the light sensor. The reticle generally consists of alternate opaque and transparent sections which are moved past the field of view of the light sensor at a constant speed. The opaque and transparent sections generally have a width which is slightly larger than the width of the brightest stars to be tracked. Thus, the desired light from the star to be tracked will be modulated at a frequency which is determined by the speed with which the alternate transparent and opaque sections move past the star. The reticle will have less effect, however on the light from large bright objects in the background since more of the transparent sections will transmit light thereby allowing nearly the same amount of light to pass through the reticle regardless of the movement thereof. An electrical filter is then used to separate the signals indicative of the modulated starlight from the signals indicative of the background light. Thus, the effect of background light is reduced by simply modulating the light.

However, using a moving reticle does not completely eliminate the background light since this light will also be modulated slightly because of a combination of the background light gradient and edge modulation. The cause of edge modulation can be seen more clearly by assuming that the field of view of the light sensor is a square window having a constant gradient of light from one edge to the other with the brightest portion at the right-hand edge and the brightness slowly decreasing to the left-hand edge. It should be understood that a constant variation is simply used for explanation purposes and the present invention also operates where the gradient is not constant. Next assume, for ease in explanation, that the transparent and opaque sections of the reticle used to modulate the light entering the field of view are vertical bars and that an opaque section is immediately adjacent the left-hand edge of the window while a transparent section is immediately adjacent the right-hand edge of the window. It can be seen that if the reticle is moved a distance equal to the width of one section so that a transparent section is immediately adjacent the left-hand edge while an opaque section is immediately adjacent the right-hand edge less background light will enter the sensor than entered previously. This will be true regardless of the size or initial position of the transparent and opaque sections of the reticle. Thus, all of the light in the entire field of view of the light sensor will be modulated at a frequency dependent upon the movement of the reticle.

In the present invention a pair of light sensors, or photo cells, are mounted so that each of them receives approximately one-half of the light passing through the field of view of the apparatus. A reticle is utilized to modulate the light so that the background light falling on one sensor is modulated approximately the same as the background light falling on the other sensor. The light sensors are connected in parallel but in the opposite phase relationship and in circuit with a filtering means so that only the electrical signals produced by the light sensors which are pulsating at the desired frequency are apparent at the output. Any electrical signals produced by the two sensors which do not have the desired frequency, that is the resonant frequency of the filtering means, are immediately eliminated by the filtering means. Also, the outputs of the two sensors oppose each other and any electrical signal which the first sensor produces and which is also produced by the second sensor is automatically cancelled. Thus, the only signal which appears at the output is a signal prevalent on only one light sensor and which has a frequency equal to the resonant frequency of the filtering means. Thus, the present invention completely eliminates all background gradient light.

It is an object of the present invention to provide an improved control apparatus.

Another object of the present invention is to provide an improved radiation sensor.

A further object of the present invention is to provide an improved light sensor upon which background gradient light has little or no effect.

These and other objects of the present invention will become apparent to those skilled in the art upon consideration of the accompanying specification, claims, and drawings, of which:

Figure 1:
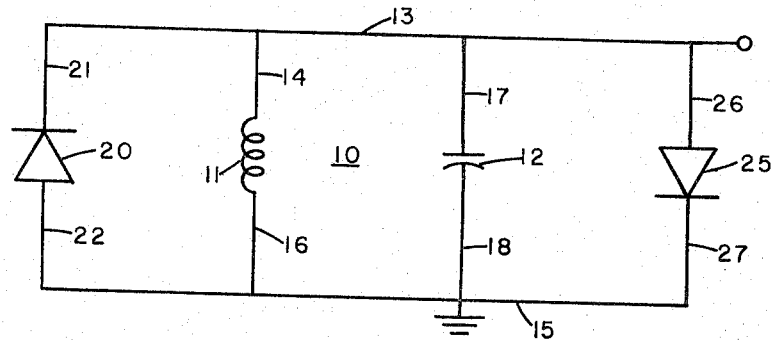
FIGURE 1 is a schematic diagram of the present invention.

In FIGURE 1 the numeral 10 designates a filtering means which in this embodiment is a parallel tank circuit comprised of an inductance 11 and a capacitance 12. It should be noted that while the inductance 11 and the capacitance 12 are shown as single components for convenience they might actually be distributed or consist of a number of different components. Also, while a parallel tank circuit is used as a filtering means in this embodiment it should be understood that any of a variety of filtering means might be used and still be within the scope of this invention. One side of the inductance 11 is connected to an output lead 13 by a connecting lead 14. The other side of the inductance 11 is connected to ground 15 by a connecting lead 16. The capacitance 17 is connected to the output lead 13 by a lead 17 and to ground 15 by a lead 18. A first radiation sensor 20, which in this embodiment is a photo cell, is connected to the output lead 13 by a connecting lead 21 and to ground 15 by a connecting lead 22. Photo cell 20 is connected in the circuit so that the electric current produced in response to light impinging upon the photo cell 20 travels from ground 15 through the photo cell 20 to the output lead 13. A second photo cell 25 is connected to the output lead 13 by a connecting lead 26 and to ground 15 by a connecting lead 27. The photo cell 25 is connected into the circuit so that the current produced by light impinging thereon will travel from the output lead 13 through the photo cell 25 to ground 15.

In the operation of the circuit in FIGURE 1 current traveling through the photo cell 25 is in the opposite phase relationship of the current traveling through the photo cell 20. The parallel tank circuit 10 operates as a short circuit from the output lead 13 to ground 15 for all currents except those having a frequency equal to the resonant frequency of the parallel tank circuit 10. Any light impinging upon photo cell 20 and photo cell 25 with approximately equal intensity causes the photo cells to produce approximately equal currents which travel in the circuit of FIGURE 1 in opposite directions and, thus, cancel each other out. Also, any light impinging upon one of the photo cells must be varying at a frequency equal to the resonant frequency of the tank circuit 10 or the current produced by that photo cell will be shorted to ground 15.

Figure 2:
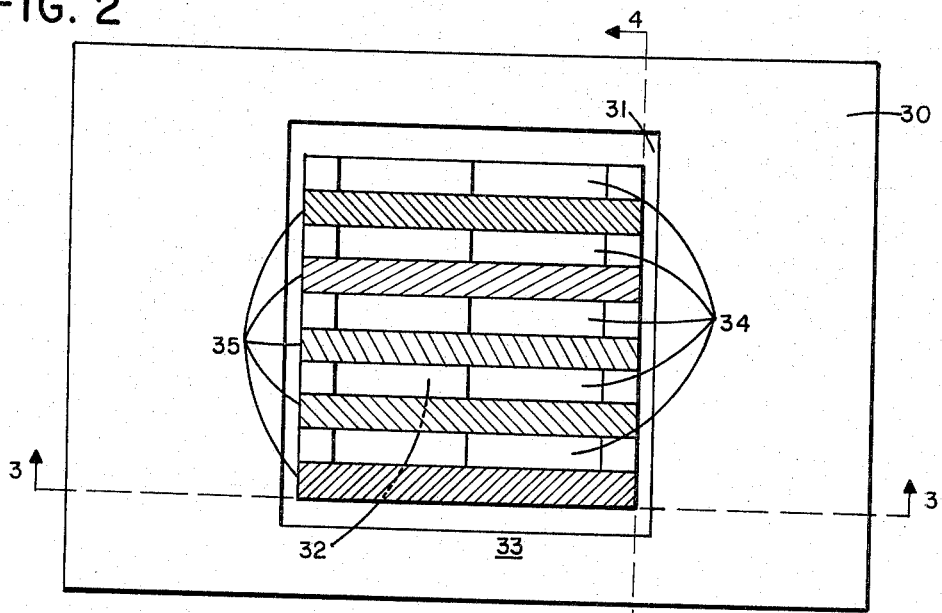
FIGURE 2 is a front view looking into the present apparatus.

In FIGURE 2 a housing 30 is shown having a rectangular recessed portion 31 in approximately the center thereof. A smaller rectangular opening 32 is shown in approximately the center of the recessed portion 31. A rectangular reticle 33 comprised of bar shaped rectangular sections alternately opaque and transparent is mounted, by means not shown, in the recessed area 31 so as to completely cover the opening 32. The sections 34 are left clear in the figure to indicate that they are transparent while the sections 35 are cross hatched to indicate they are opaque. The sections have been made relatively large in the figures for ease in understanding the present invention. However, it should be understood that in actual practice the width of each section would be much smaller than is shown. The reticle 33 is mounted for lateral movement in the recessed rectangular area 31 by some means not shown. The reticle 33 is capable of moving laterally a distance approximately equal to the width of one section in either direction within the recessed area 31. This particular embodiment is utilized simply for ease in explaining the invention and it should be noted that in actual practice the reticle would probably be capable of a much larger movement. Thus, to modulate the light which is transmitted through the opening 32 in housing 30 the reticle 33 oscillates continuously in the recessed area 31.

Figure 3:
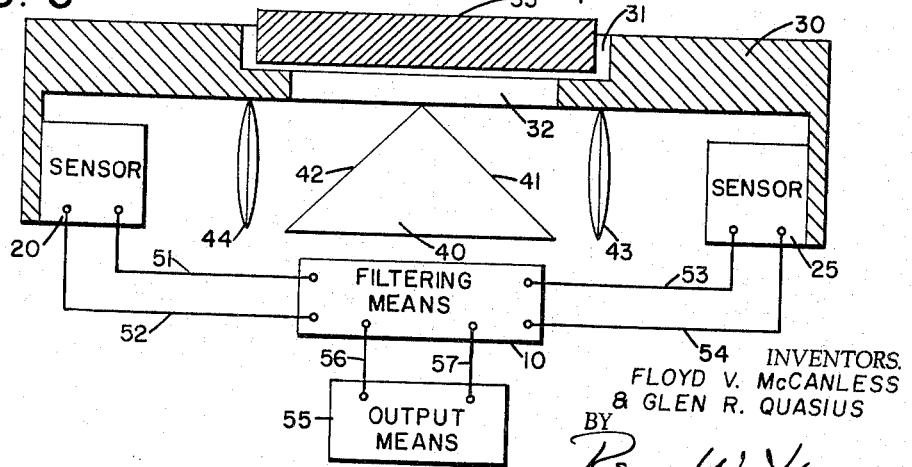
FIGURE 3 is a partial cutaway, somewhat schematic view of the present invention.

FIGURE 3 is a side view of the apparatus in FIGURE 2 along the sectional line 3—3. In FIGURE 3 the reticle 33 is shown mounted, by means not shown, in the recessed area 31 of housing 30. A reflecting pyramid 40 is mounted, by means not shown, below the opening 32 in housing 30 so that approximately one-half of the light passing through the opening 32 is reflected from a side 41 of the reflecting pyramid 40 toward the right-hand side of FIGURE 3 and the other approximately one-half of the light passing through the opening 32 is reflected by a side 42 of the reflecting pyramid 40 toward the left-hand side of FIGURE 3. The light reflecting from the side 41 of pyramid 40 is focused by a lens system, which in this embodiment is a single spherical lens 43, onto a light sensor 25. The light which is reflected from the side 42 of pyramid 40 is focused by a lens system, which in this embodiment is a single spherical lens 44, onto a light sensor 20. It should be noted that the electrical components in FIGURE 3 are numbered the same as the components in FIGURE 1 so that the schematic diagram of FIGURE 1 may be coordinated with the block diagram of FIGURE 3. The sensor 20 is connected to a filtering means 10 by a pair of leads 51 and 52. The sensor 25 is connected to the filtering means 10 by a pair of leads 53 and 54. The filtering means 10 is connected to an output means 55, which may be any device capable of utilizing the output signals from the radiation sensor, by a pair of leads designated 56 and 57.

FIGURE 4 illustrates how edge modulation with a background light gradient occurs. In FIGURE 4(A) a graph illustrates background light having a gradient across the field of view from zero at the left-hand side to some higher value at the right-hand side of the field of view. For simplicity of explanation the gradient of the background light has been given a uniform slope which is illustrated by the line 61. However, it should be understood that edge modulation would occur substantially as will be explained whether the light gradient has a uniform slope or not. A pip 60 on the line 61 illustrates a desired light source which may be a star or other source.

Figure 4A:
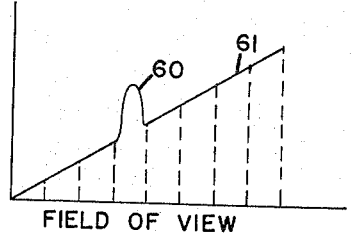
FIGURES 4(A), (B), (C) and (D) are sequential, partial cross-sectional views of the apparatus and graphs of the light passing therethrough.
Figure 4B:
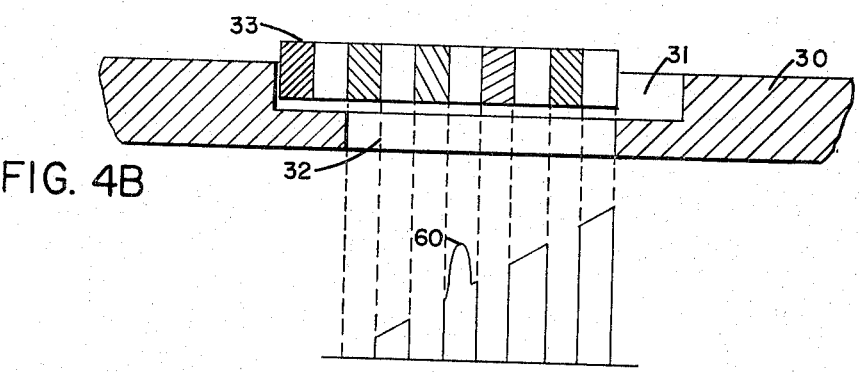

In FIGURE 4(B) a portion of a breakaway view of the housing 30 along the line 4—4 (FIGURE 2) is illustrated. The reticle 33 is shown in the position of maximum displacement to the left. The graph in FIGURE 4(B) illustrates the amount of background light passing through the transparent sections of reticle 33 while it is in the position shown.

Figure 4C:
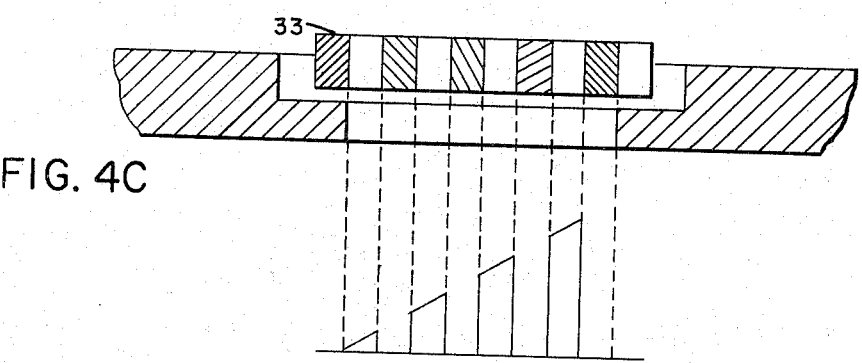

In FIGURE 4(C), which illustrates the same portion of the apparatus shown in FIGURE 4(B), the reticle 33 has been moved to its center position. The graph beneath the reticle in FIGURE 4(C) illustrates the amount of light passing through the transparent sections of the reticle 33 while it is in the position shown. It should be noted that the amount of light passing through the reticle when it is in the position shown in FIGURE 4(C) will be less than the amount of light passing through the reticle when it is in the position shown in FIGURE 4(B), as illustrated by the graph, because of the movement of the transparent and opaque sections along the light gradient.

Figure 4D:
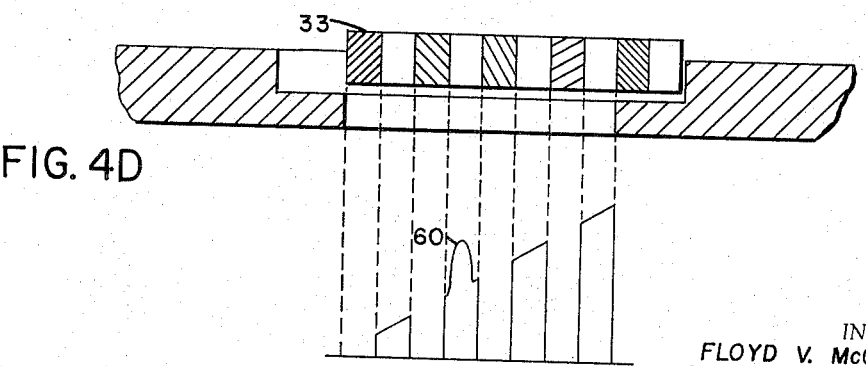

In FIGURE 4(D), which illustrates the same portion of the apparatus shown in FIGURE 4(B), the reticle 33 has been displaced to its maximum right-hand position. The graph beneath the reticle illustrates the amount of light passing through the transparent sections of the reticle 33 while it is in the position shown. It should be noted from the graph in FIGURE 4(D) that the amount of light passing through the reticle when it is in the position shown in FIGURE 4(D) is again equal to the amount of light passing through the reticle when it is in the position shown in FIGURE 4(B). Thus, the background light has passed through approximately one cycle of modulation while the reticle has moved a distance equal to the width of two sections.

In FIGURE 4(B) the light illustrated by pip 60 passes completely through a transparent section in reticle 33 and produces a pip in the output. In FIGURE 4(C) the pip 60 is completely masked by an opaque section in reticle 33 and has no effect on the output. In FIGURE 4(D) the pip 60 again passes completely through a transparent section in the reticle 33 and produces a pip in the output. The desired radiation illustrated by the pip 60 has passed through a complete cycle of modulation. Thus, the desired radiation is modulated at a frequency equal to the frequency of the edge modulation of the background light. By tuning the filtering means 10 to the frequency of the desired radiation a large portion of the modulated background light common to both sensors 20 and 25 is eliminated while the current produced by the photo cell which receives the signal light, illustrated by the pip 60, appears as an output signal indicative of the desired light.

As was explained in conjunction with FIGURE 3 the sensor 20 receives approximately the same amount of background light as the sensor 25. It should be noted that the edge modulation by the reticle 33 of the background light has substantially the same effect on the light passing through to the sensor 20 as it does on the light passing through to the sensor 25. Thus, since the sensor 20 and the sensor 25 are connected in phase opposition, as shown in FIGURE 1, the electrical current produced by the sensor 20 due to the background light impinging thereon substantially cancels the electrical current produced by the sensor 25 due to the background light impinging thereon. The overall effect of the present apparatus is to produce a signal which is substantially zero due to the background light and to thereby allow the radiation sensor to distinguish the desired light source from the background light.

While I have shown and described a specific embodiment of this invention, the invention should not be limited to the particular form shown, and I intend in the appended claims to cover all modifications which do not depart from the spirit and scope of the invention.

What is claimed is:

1. A radiation sensor having background gradient radiation rejection characteristics for distinguishing a desired radiation source from background gradient radiation comprising:

means for modulating the radiation at a predetermined frequency;

reflecting means for dividing said modulated radiation into first and second substantially equal portions;

a first detecting means positioned and adapted so as to receive said first portion and generate an electrical signal indicative thereof;

a second detecting means positioned and adapted so as to receive said second portion and generate an electrical signal indicative thereof;

electrical filtering means connected to said detecting means so as to pass only signals of said predetermined frequency; and means connecting said first and second detecting means in parallel phase opposition so as to cancel out signals which are detected from both portions of said radiation.

2. The apparatus of claim 1 in which said reflecting means comprises a reflecting pyramid positioned in the path of the radiation so as to reflect approximately one-half of the received radiation toward said first detecting means and the remaining radiation toward said second detecting means; and said modulating means comprises a moving reticle.

References Cited by the Examiner

UNITED STATES PATENTS

| | | | |
|---|---|---|---|
| 2,032,010 | 2/1936 | Goodwin | 250—212 |
| 2,059,786 | 11/1936 | Gilbert | 250—204 |
| 3,174,045 | 3/1965 | Whitney et al. | 250—203 |
| 3,219,828 | 11/1965 | Foster | 250—203 |

RALPH G. NILSON, *Primary Examiner.*

M. ABRAMSON, *Assistant Examiner.*